(12) United States Patent
Wei (10) Patent No.: US 12,041,480 B2
(45) Date of Patent: Jul. 16, 2024

(54) USER EQUIPMENT AND WIRELESS COMMUNICATION METHOD FOR NEURAL NETWORK COMPUTATION

(71) Applicant: Acer Incorporated, New Taipei (TW)

(72) Inventor: Hung-Yu Wei, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 387 days.

(21) Appl. No.: 17/308,256

(22) Filed: May 5, 2021

(65) Prior Publication Data

US 2022/0361037 A1   Nov. 10, 2022

(51) Int. Cl.
*H04W 28/02* (2009.01)
*G06N 20/00* (2019.01)
*H04W 72/1263* (2023.01)

(52) U.S. Cl.
CPC ........ *H04W 28/0268* (2013.01); *G06N 20/00* (2019.01); *H04W 28/0278* (2013.01); *H04W 72/1263* (2013.01)

(58) Field of Classification Search
None
See application file for complete search history.

(56) References Cited

U.S. PATENT DOCUMENTS 10,931,602 B1 *  2/2021  Matthews ............... H04L 49/35
11,461,690 B2   10/2022  Szeto et al.
2018/0260256 A1  9/2018  Kadav et al.
2018/0307986 A1  10/2018  Kabul et al.
2020/0137675 A1 *  4/2020  Park ..................... H04W 68/005
2020/0401402 A1 *  12/2020  Capalija .............. G06F 15/7825
2022/0182802 A1 *  6/2022  Pezeshki ............... H04W 72/21

FOREIGN PATENT DOCUMENTS

| CN | 110308987 A | | 10/2019 | |
| EP | 2986073 A1 | * | 2/2016 | ........... H04L 1/1854 |
| EP | 4169333 A1 | * | 4/2023 | |
| TW | 201812646 A | | 4/2018 | |

OTHER PUBLICATIONS

Chinese language office action dated Jan. 10, 2023, issued in application No. TW 110147648.

* cited by examiner

*Primary Examiner* — Derrick W Ferris
*Assistant Examiner* — Keith Follansbee
(74) *Attorney, Agent, or Firm* — McClure, Qualey & Rodack, LLP (57) ABSTRACT

A user equipment (UE) includes a processor and a transmitter. The processor performs a neural network computation to generate a plurality of neural network computation results, wherein the neural network computation results are included in a data packet, and the neural network computation results are intermediate data of the neural network computation. The transmitter transmits the data packet to a base station. The data packet includes a descriptor and the descriptor includes parameters and settings corresponding to the neural network computation results.

20 Claims, 8 Drawing Sheets

USER EQUIPMENT AND WIRELESS COMMUNICATION METHOD FOR NEURAL NETWORK COMPUTATION

BACKGROUND OF THE INVENTION

Field of the Invention

The invention generally relates to neural network computation technology, and more particularly, to neural network computation technology for transmitting the intermediate data of the neural network computation generated by the user equipment (UE).

Description of the Related Art

Artificial neural networks (ANNs) and neural networks (NNs) have become important machine learning techniques to provide intelligent solutions for many application domains. In addition, Deep Learning, which utilizes the deep structure of neural networks, has shown a great potential to achieve excellent performance for machine learning tasks.

Recently, neural network-based machine learning tasks are partitioned between different networking nodes for distributed processing. Model level pipeline composition partitions try to improve latency performance by allocating different machine learning tasks among different networking nodes. For example, an object detection module is executed by a mobile device, and the detected object (e.g. the face of a person) may be transmitted to a Multi-access Edge Computing (MEC) node for facial recognition.

On the other hand, a layer-level pipeline composition partitions the entire neural network (or deep learning) model into neural network (or deep learning) sub-models, so that they can be deployed in a wireless device/edge computing node/cloud computing node. In this type of neural network decomposition, some calculated neural network coefficients may be transmitted to the other computing node for next-stage processing. However, conventional wireless communication methods are not designed to carry transmissions for neural network coefficients or the partial computational results of neural network models.

BRIEF SUMMARY OF THE INVENTION

A user equipment and communication method for neural network computation are provided to overcome the problems mentioned above.

An embodiment of the invention provides a user equipment for neural network computation. The UE comprises a processor and a transmitter. The processor performs a neural network computation to generate a plurality of neural network computation results, wherein the neural network computation results are comprised in a data packet, and the neural network computation results are intermediate data of the neural network computation. The transmitter transmits the data packet to a base station. The data packet comprises a descriptor and the descriptor comprises parameters and settings corresponding to the neural network computation results.

In some embodiments, the data packet further comprises a packet header and a data payload. The packet header comprises an indicator to indicate that the data packet. The data payload comprises the neural network computation results.

In some embodiments, the parameters and settings corresponding to the neural network computation results comprise: a neural network type, number of layers in the neural network, a size of the neural network computation results, level of the neural network computation results, a sequence number, and a time stamp.

In some embodiments, a Protocol Data Unit (PDU) type is set in the data packet to indicate that the data packet is being used to carry the neural network computation results.

In some embodiments, a Quality of Service (QoS) type is set in the data packet to indicate that the data packet is being used to carry the neural network computation results with corresponding QoS characteristics.

In some embodiments, the data packet comprises a QoS Flow Identifier (QFI) or a 5G QoS Identifier (5QI).

In some embodiments, the processor maps neural network communication QoS Flow to a data radio bearer (DRB) that provides communication performance for the neural network computation results.

In some embodiments, the transmitter sends a scheduling request to the base station for the neural network computation. The scheduling request includes a binary indication to indicate that the scheduling request is for the neural network computation, a request type, a request descriptor, a model identifier, and a size of the neural network computation results. In some embodiments, the scheduling request further includes a semi-persistent scheduling description, the number of repetitions of data transmission, and a periodicity of an uplink data packet transmission.

In some embodiments, the transmitter sends an uplink buffer status reports (BSR) message to the base station for the neural network computation, wherein the BSR message includes a message descriptor, wherein the message descriptor includes a neural network type and a size of the neural network computation results.

In some embodiments, the transmitter sends a network slice establishment request message to the base station for the neural network computation, wherein the network slice establishment request message includes a message descriptor, wherein the message descriptor includes a neural network type, a size of the neural network computation results, an average rate of a transmission of the neural network computation results, and a peak rate of the transmission of the neural network computation results.

In some embodiments, the transmitter sends a Radio Resource Control (RRC) connection setup message to the base station, wherein the RRC connection setup message includes a binary indication to indicate that the RRC connection setup message is for the neural network computation, a Protocol Data Unit (PDU) session type field, and a message descriptor. After the base station receives the RRC connection setup message, the base station establishes a PDU session for a neural network communication.

In some embodiments, the user equipment further comprises a receiver. The receiver receives a RRC configuration from the base station, wherein after receiving the RRC configuration, the transmitter transmits the data packet to the base station.

An embodiment of the invention provides a wireless communication method for neural network computation. The communication method is applied to a user equipment (UE). The communication method comprises the steps of using a processor of the UE to perform a neural network computation to generate a plurality of neural network computation results; wherein the neural network computation results are comprised in a data packet, and the neural network computation results are intermediate data of the neural network computation; and using a transmitter of the UE to transmit the data packet to a base station, wherein the data packet comprises a descriptor and the descriptor comprises parameters and settings corresponding to the neural network computation results.

Other aspects and features of the invention will become apparent to those with ordinary skill in the art upon review of the following descriptions of specific embodiments of user equipment and wireless communication method for neural network computation.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

DETAILED DESCRIPTION OF THE INVENTION

Figure 1:
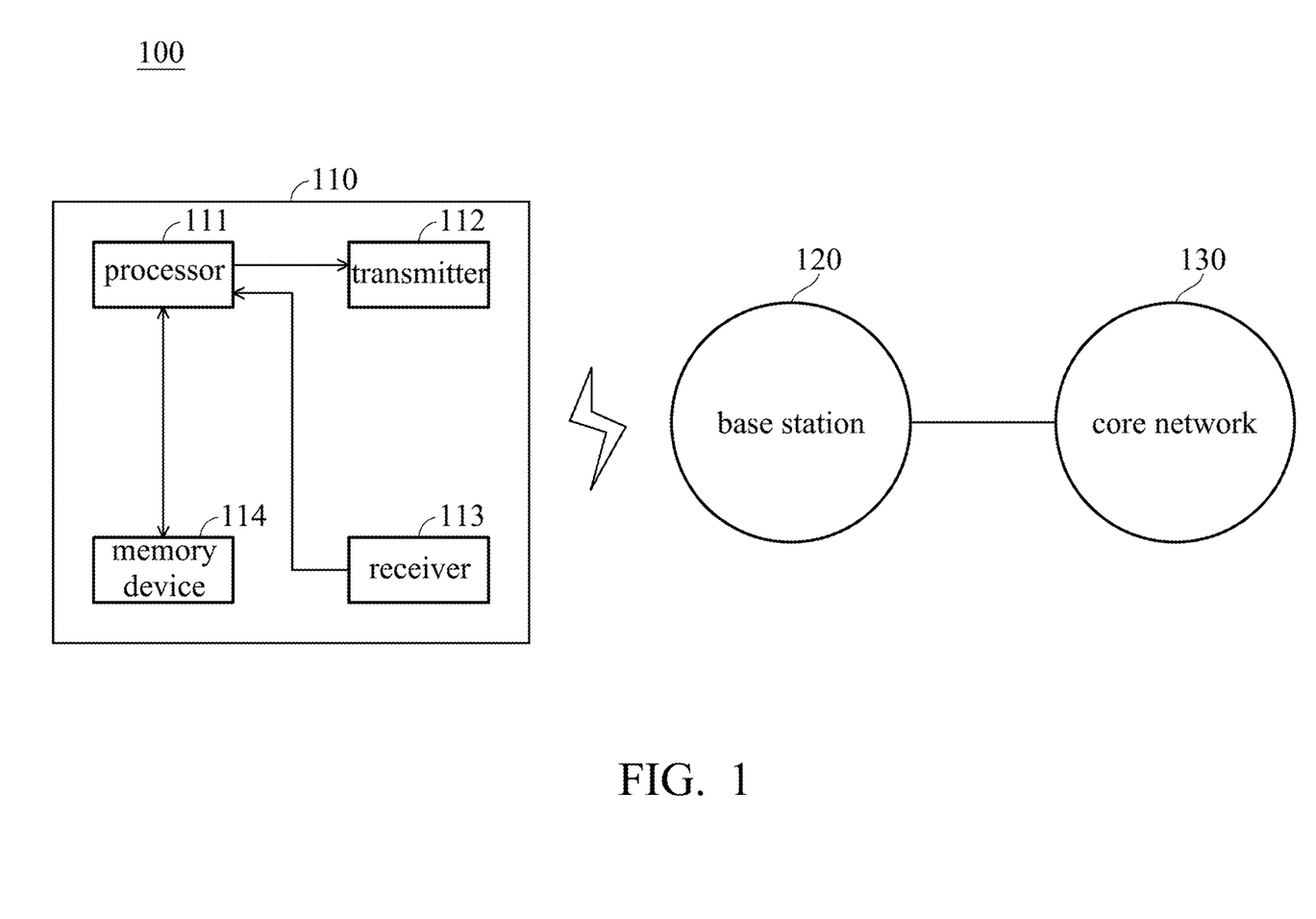
FIG. 1 is a block diagram of a wireless communication system 100 in accordance with some embodiments of the invention.

FIG. 1 is a block diagram of a wireless communication system 100 in accordance with some embodiments of the invention. In the embodiments of the invention, the wireless communication system 100 is applied to a machine learning technology, e.g. a neural network (NN) technology. As shown in FIG. 1, the wireless communication system 100 includes a user equipment (UE) 110, a base station 120 and a core network 130. Note that, in order to clarify the concept of the invention, FIG. 1 presents a simplified block diagram in which only the elements relevant to the invention are shown. However, the invention should not be limited to what is shown in FIG. 1.

In the embodiments of the invention, the UE 110 may be a smartphone, a wearable device, a laptop, a desktop, an Internet of Things (IoT) node (e.g. a network camera, or a wireless sensor node which has some processing capability for sensed data, but the invention should not be limited thereto), a gateway or an edge device, but the invention should not be limited thereto.

As shown in FIG. 1, the UE 110 may comprise a processor 111, a transmitter 112, a receiver 113 and a memory device 114. Note that, in order to clarify the concept of the invention, UE 110 of FIG. 1 presents a simplified block diagram in which only the elements relevant to the invention are shown. However, the UE 110 should not be limited to what is shown in FIG. 1.

In the embodiments of the invention, the processor 111 may be a Central Processing Unit (CPU) or a Graphics Processing Unit (GPU). The processor 111 is used for the neural network computation. According to an embodiment of the invention, the processor 111 may control the operations of the transmitter 112, the receiver 113 and the memory device 114.

In the embodiments of the invention, the transmitter 112 may transmit the data packet or message to the base station 120 and the receiver 113 may receive the data packet or message from the base station 120. In an embodiment of the invention, the transmitter 112 and the receiver 113 may be integrated into a transceiver. In the embodiments of the invention, the transmitter 112 and the receiver 113 may be applied to 3G, 4G, 5G or Wi-Fi communication, but the invention should not be limited thereto.

In the embodiments of the invention, the memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof. In the embodiments of the invention, the memory device 114 may store the data corresponding to the neural network computation.

In the embodiments of the invention, the base station 120 may be an evolved Node B (eNB) or a Generation Node B (gNB). In the embodiments of the invention, the core network 130 may be a 4G core network or a 5G core network, but the invention should not be limited thereto.

Figure 2:
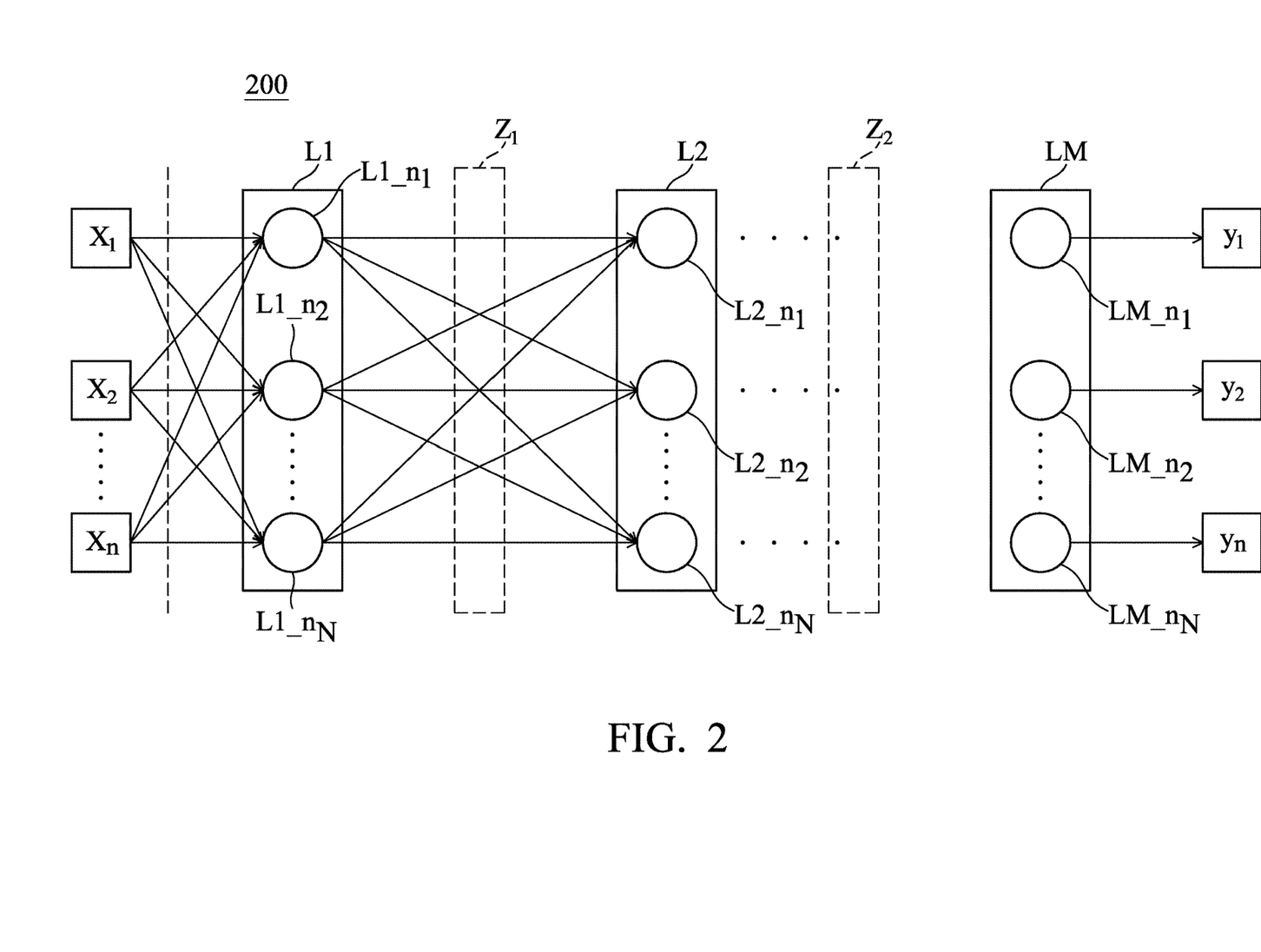
FIG. 2 is a schematic diagram of the neural network computation in accordance with some embodiments of the invention.

FIG. 2 is a schematic diagram of the neural network computation 200 in accordance with some embodiments of the invention. As shown in FIG. 2, the neural network computation 200 may include layers L1, L2, . . . , LM. The layer L1 includes computation nodes L1_$n$1, L1_$n$2, . . . , L1_$n$N. The layer L2 includes computation nodes L2_$n$1, L2_$n$2, . . . , L2_$n$N. The layer LM includes computation nodes LM_$n$1, LM_$n$2, . . . , LM_nN. In the embodiment, input data x1, x2, . . . , xn are sent to the computation nodes L1_$n$1, L1_$n$2, . . . , L1_$n$N in the layer L1 for neural network computation to obtain the intermediate data Z1. The intermediate data Z1 are neural network computation results corresponding to the computation nodes L1_$n$1, L1_$n$2, . . . , L1_$n$N in the layer L1. In addition, the intermediate data Z1 are sent to the computation nodes L2_$n$1, L2_$n$2, . . . , L2_$n$N in the layer L2 for neural network computation to obtain the intermediate data Z2. The intermediate data Z2 are neural network computation results corresponding to the computation nodes L2_$n$1, L2_$n$2, . . . , L2_$n$N in the layer L2. Accordingly, the intermediate data ZM−1 are sent to the computation nodes LM_n1, LM_n2, LM_nN in the layer LM for neural network computation to obtain the intermediate data ZM (can be regarded as input data y1, y2, . . . yn of the neural network computation). The intermediate data ZM are neural network computation results corresponding to the computation nodes LM_n1, LM_n2, LM_nN in the layer LM. In an embodiment of the invention, the UE 110 may be in charge with dealing with the neural network computation of several layers. For example, the UE 110 may be in charge with dealing with the neural network computation of layer L1 and layer L2 to generate the intermediate data Z1 and the intermediate data Z2 (i.e. the neural network computation results corresponding to the layer L1 and layer L2). Then, the UE 110 may sequentially transmit the intermediate data Z1 and the intermediate data Z2 to the base station 120 for the remaining neural network computation corresponding to other layers.

Figure 3:
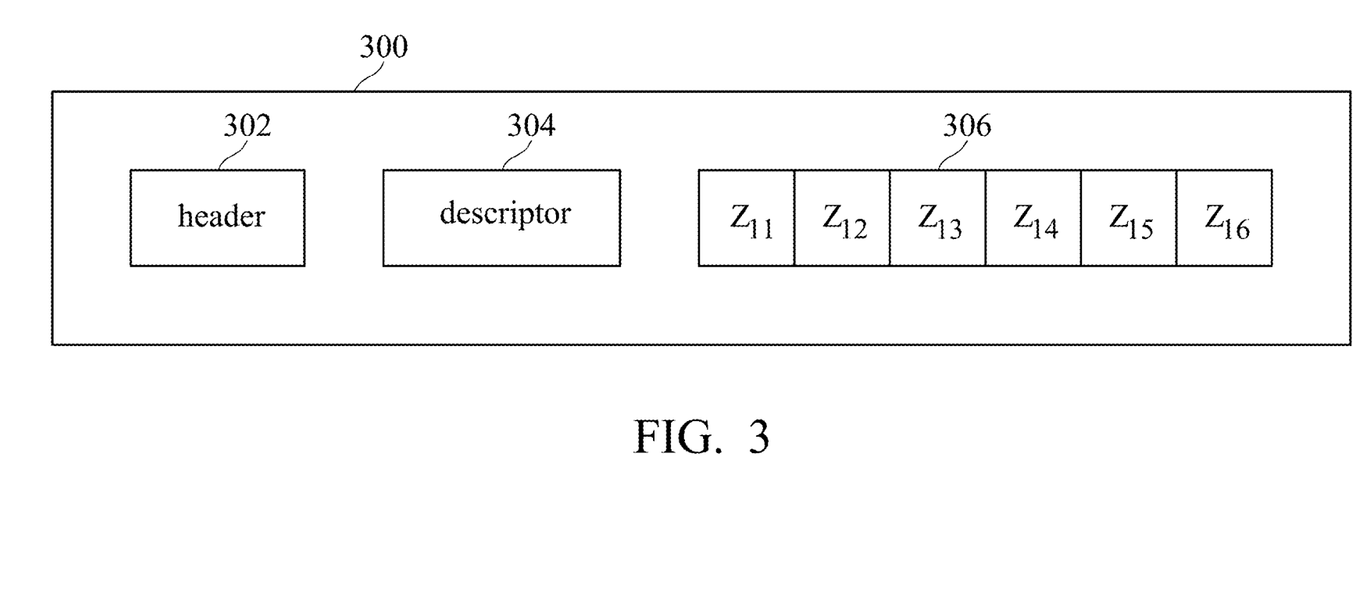
FIG. 3 is a schematic diagram of a data structure of a data packet in accordance with some embodiments of the invention.

FIG. 3 is a schematic diagram of a data structure of a data packet in accordance with some embodiments of the invention. In an embodiment of the invention, the neural network computation results (e.g. the intermediate data $Z_1$ or the intermediate data $Z_2$ shown in FIG. 2, but the invention should not be limited thereto) generated by the UE 110 may be carried in a data packet 300. Then, the UE 110 may transmit the data packet 300 to the base station 120 for the remaining neural network computation corresponding to other layers. As shown in FIG. 3, the data packet 300 may include a packet header 302, a descriptor 304, and a data payload 306. In the embodiment, the packet header 302 may include an indicator to indicate that the data packet 300 includes the neural network computation results, for example, the neural network computation results corresponding to the computation nodes $L1\_n_1$, $L1\_n_2$, . . . , $L1\_n_N$ in the layer L1 or the neural network computation results corresponding to the computation nodes $L2\_n_1$, $L2\_n_2$, . . . , $L2\_n_N$ in the layer L2. In the embodiment, the descriptor 304 may include the parameters and settings for the neural network computation results generated by the UE 110. In the embodiment, the data payload 306 may include the neural network computation results generated by the UE 110.

In some embodiments, the parameters and settings for the neural network computation results may include the type of the neural network (e.g. the Model 1 or Model 2 shown in FIGS. 4A and 4B, but the invention should not be limited thereto), the number of layers in the neural network (e.g. two layers, the layer L1 and layer L2, but the invention should not be limited thereto), the size of the neural network computation results (e.g. as shown in FIG. 3, the neural network computation results corresponding to layer L1 in the data payload 306 may include 6 elements $Z_{11}$, $Z_{12}$, $Z_{13}$, $Z_{14}$, $Z_{15}$ and $Z_{16}$, but the invention should not be limited thereto), the level of the neural network computation results (e.g. the layer L1 or layer L2, but the invention should not be limited thereto), a sequence number (i.e. the sequence number of the neural network computation results), and a time stamp (i.e. the time of transmitting the neural network computation results), but the invention should not be limited thereto.

Figure 4A:
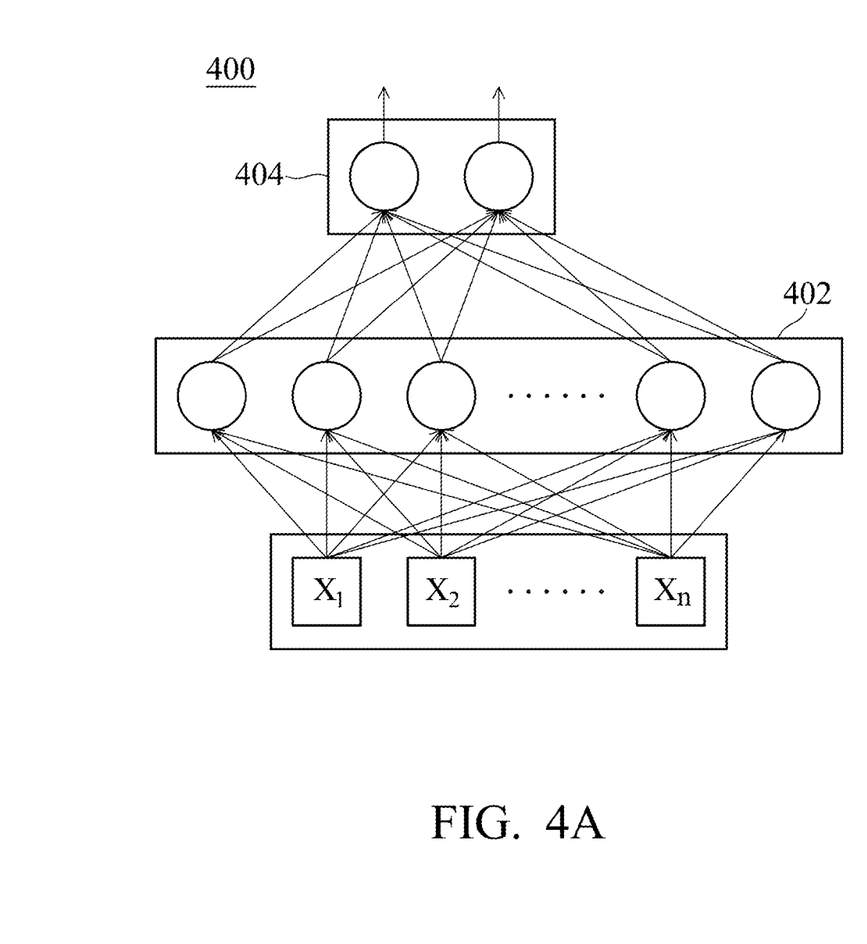
FIG. 4A is a schematic diagrams of a neural network type in accordance with an embodiment of the invention.
Figure 4B:
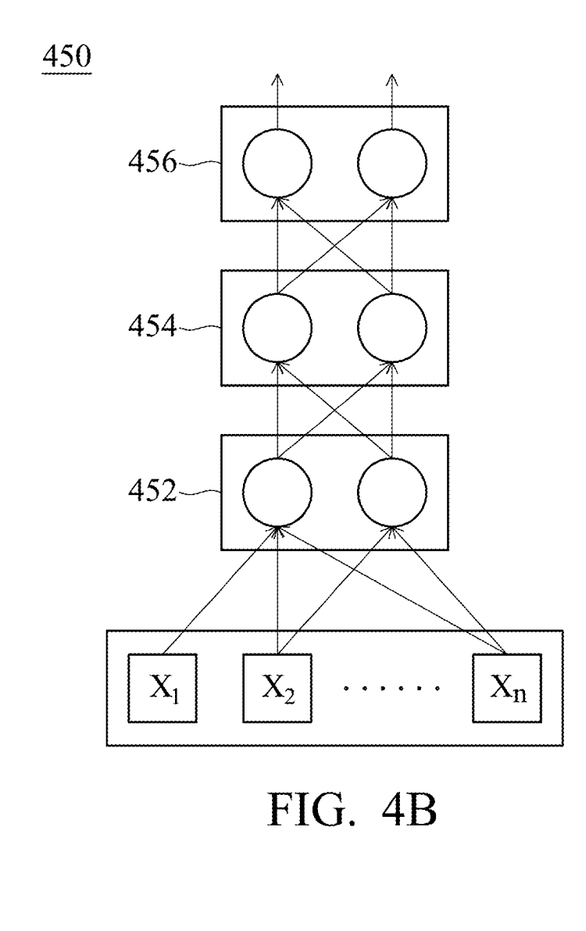
FIG. 4B is a schematic diagrams of another neural network type in accordance with another embodiment of the invention

FIG. 4A is a schematic diagrams of a neural network type in accordance with an embodiment of the invention. As shown in FIG. 4A, a neural network type 400 has a total of two layers including a layer 402 and a layer 404. The layer 402 in the neural network model 400 includes a plurality of computation nodes, and the layer 404 in the neural network model 400 includes two computation nodes. FIG. 4B is a schematic diagrams of another neural network type in accordance with another embodiment of the invention. As shown in FIG. 4B, a neural network model 450 has a total of three layers including a layer 452, a layer 454 and a layer 456. Each of the layers 452, 454 and 456 in the neural network type 450 includes two computation nodes. It should be noted that the neural network type shown in FIG. 4A and FIG. 4B are only used to illustrate the embodiments of the invention, but the invention should not be limited thereto.

In some embodiments of the invention, the data packet (e.g. data packet 300) transmitted from the UE 110 to the base station 120 may include a new Protocol Data Unit (PDU) type. The PDU type is set to indicate that the data packet is used to carry the neural network computation results. In some embodiments, the data packet (e.g. data packet 300) transmitted from the UE 110 to the base station 120 may include a new Quality of Service (QoS) type. The QoS type is set to indicate that the data packet is used to carry the neural network computation results with corresponding QoS characteristics.

In some embodiments of the invention, the UE 110 may control the Quality of Service (QoS) for the neural network communication between the UE 110 and the base station 120. In the embodiments, the data packet (e.g. data packet 300) transmitted from the UE 110 to the base station 120 may include QoS Flow Identifier (QFI) to indicate that the data packet is used to carry the neural network computation results. In addition, in the embodiments, the UE 110 may map the neural network communication QoS Flow to a data radio bearer (DRB) that provides communication performance for the neural network computation results.

In some embodiments of the invention, the data packet (e.g. data packet 300) transmitted from the UE 110 to the base station 120 may include 5G QoS Identifier (5QI). The 5QI is set to indicate that the data packet is used to carry the neural network computation results.

In some embodiments of the invention, the UE 110 may put the data packet (e.g. data packet 300) that includes the neural network computation results into a specific data buffer (not shown in figures).

In some embodiments of the invention, the UE 110 may set QoS scheduling policies based on the QoS requirements of the neural network communication between the UE 110 and the base station 120.

In some embodiments of the invention, the UE 110 may configure scheduling policies based on the traffic characteristics and application requirements of the neural network communication between the UE 110 and the base station 120. The scheduling policies are set by considering the neural network processing time for data processing. According to the scheduling policies, the transmitter 112 of the UE 110 may send a scheduling request to the base station for the neural network computation. In an embodiment of the invention, the scheduling request may include a binary indication to indicate that the scheduling request is for the neural network computation, a request type, a request descriptor, a model identifier, and a size of the neural network computation results. The binary indication may indicate that the scheduling request is for the neural network communication. The request type may indicate that the process (e.g. Dynamic Grant or Semi-Persistent Scheduling (SPS)) corresponding to the scheduling request. The request descriptor describes the characteristics of the scheduling request. The model identifier may describe the neural network type (e.g. the neural network type 400 and the neural network type 450, but the invention should not be limited thereto).

In some embodiments of the invention, the UE 110 may send an uplink buffer status report (BSR) message to the base station 120. The BSR message may include an indicator to show whether a set of neural network computation results is available in the specific data buffer for uplink transmission. The BSR message may also include a descriptor for neural network computation results. The descriptor may indicate the neural network type (e.g. the neural network type 400 and the neural network type 450, but the invention should not be limited thereto) and the size of the neural network computation results, but the invention should not be limited thereto.

In some embodiments, the UE 110 may send a network slice establishment request message to the base station 120. The network slice establishment request message may be used to establish a network slice for the neural network communication. The network slice establishment request message may include an indicator to indicate the requested network slice to support communications for the neural network computation results. The network slice establishment request message may also include a descriptor for neural network computation results. The descriptor may indicate the neural network type (e.g. the neural network type 400 and the neural network type 450, but the invention should not be limited thereto), the size of the neural network computation results, an average rate for neural network computation results transmission (e.g. how many pictures can be transmitted in one second, but the invention should not be limited thereto), and a peak rate for neural network computation results transmission (e.g. the maximum number of pictures can be transmitted in one second, but the invention should not be limited thereto), but the invention should not be limited thereto.

Figure 5:
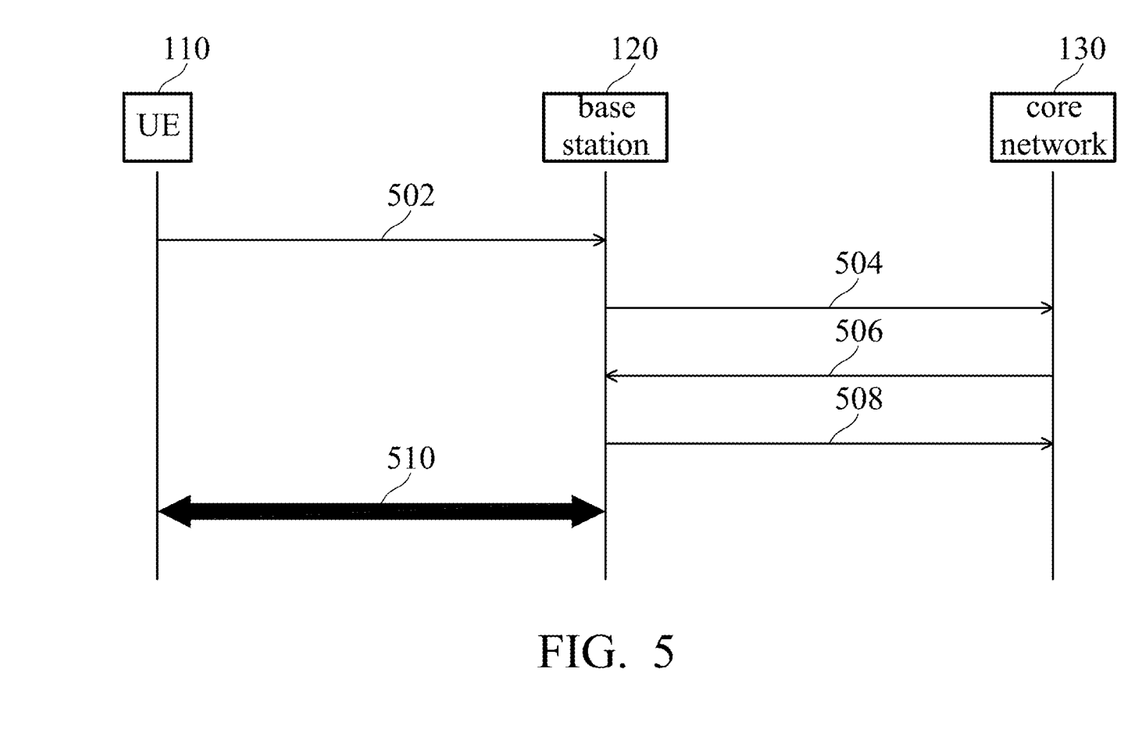
FIG. 5 is a flow chart of configuring a communication session to support transmission of the neural network communication in accordance with some embodiments of the invention.

FIG. 5 is a flow chart of configuring a communication session to support transmission of the neural network communication in accordance with some embodiments of the invention. The flow of FIG. 5 can be applied to the wireless communication system 100. As shown in FIG. 5, the wireless device UE 110 may establish a Protocol Data Unit (PDU) session with the base station 120 for the neural network communication. In step S502, the UE 110 may transmit a signaling message (e.g. an RRC connection setup message) to the base station 120 to initiate a PDU session for the neural network communication. In step S520, after base station 120 receives the signaling message, the base station 120 may transmit an initial UE message to the core network 130. In step S506, after the core network 130 receives the initial UE message, the core network 130 may send a PDU session resource setup request to the base station 120. In step S508, after the base station 120 receives the PDU session resource setup request from the core network 130, the base station 120 then transmits a PDU session resource setup response to the core network 130. In step S510, the PDU session supporting the neural network communication is established between the UE 110 and the base station 120.

In the embodiment, the signaling message (e.g. an RRC connection setup message) may include a binary indicator, a PDU session type field, and a descriptor. The binary indicator in the signaling message may indicate the session request is for the neural network communication. The PDU session type field in the signaling message may indicates the neural network type (e.g. the neural network type 400 and the neural network type 450, but the invention should not be limited thereto). The descriptor may describe the characteristics of the neural network communication (e.g. the number of layers in the neural network, the size of the neural network computation results, the level of the neural network computation results, a sequence number, and a time stamp, but the invention should not be limited thereto).

Figure 6:
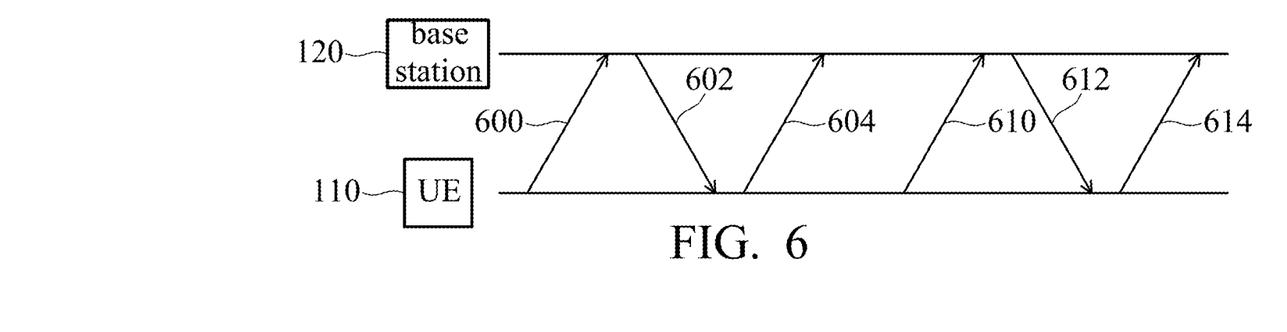
FIG. 6 is a flow chart of a neural network communication for Dynamic Grant in accordance with some embodiments of the invention.

FIG. 6 is a flow chart of a neural network communication for Dynamic Grant in accordance with some embodiments of the invention. The flow of FIG. 6 can be applied to the wireless communication system 100. As shown in FIG. 6, in step S600, the UE 110 may transmit a scheduling request (or signaling message) to the base station 120 to request the transmission of a data packet which carries the neural network computation results. In step S602, after the base station 120 receives the scheduling request, the base station 120 may sends a grant message to approve the request from the UE 110. In step 604, after the UE 110 receives the grant message, the UE 110 may transmit the data packet to the base station 120, so that one cycle of the neural network communication for Dynamic Grant will be finished.

In step S610, when the UE 110 wants to transmit the next data packet to the base station 120, the UE 110 may transmits a scheduling request to the base station 120 again to request the transmission of the next data packet carried the neural network computation results. In step S612, after the base station 120 receives the scheduling request, the base station 120 may send a grant message to approve the request from the UE 110. In step S614, after the UE 110 receives the grant message, the UE 110 may transmit data packet to the base station 120, so that another cycle of the neural network communication for Dynamic Grant will be finished. It should be noted that there are two cycles in FIG. 6, but the invention should not be limited thereto.

In the embodiments of the invention, the scheduling request in steps S600 and S610 may include a binary indication, a request type, a request descriptor, a model identifier, and a size of the neural network computation results. The binary indication may indicate that the scheduling request is for the neural network communication. The request type may indicate that the scheduling request is used for Dynamic Grant. The request descriptor describes the characteristics of the scheduling request. The model identifier may describe the neural network type (e.g. the neural network type 400 and the neural network type 450, but the invention should not be limited thereto).

Figure 7:
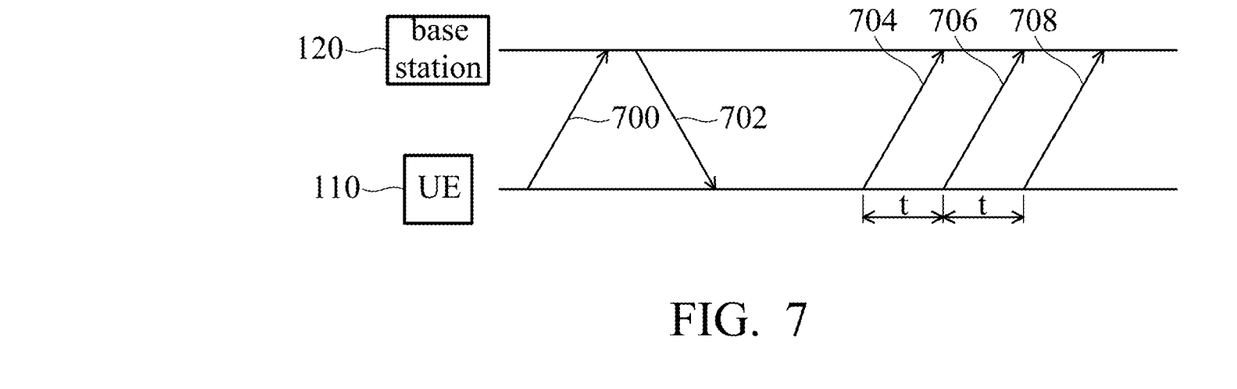
FIG. 7 is a flow chart of a neural network communication for Semi-Persistent Scheduling (SPS) in accordance with some embodiments of the invention.

FIG. 7 is a flow chart of a neural network communication for Semi-Persistent Scheduling (SPS) in accordance with some embodiments of the invention. The flow of FIG. 7 can be applied to the wireless communication system 100. As shown in FIG. 7, in step S700, the UE 110 may transmit a scheduling request (or signaling message) to the base station 120 to request the transmission of multiple uplink data packets which carry the neural network computation results. In step S702, after the base station 120 receives the scheduling request, the base station 120 may send a grant message to approve the request from the UE 110. In steps S704-S708, after the UE 110 receives the grant message, the wireless device 102 may transmit data packets periodically to the base station 120 with period t.

In the embodiments of the invention, the scheduling request in step S700 may indicates the traffic characteristics of the upcoming data transmission. Furthermore, the scheduling request in step S700 may further include a SPS description, the number of times the data transmission is repeated, and the transmission periodicity of the upcoming uplink data packets. In addition, the scheduling request in step S700 may further include a binary indication, a request type, a request descriptor, a model identifier, and a size of the neural network computation results. The binary indication may indicate that the scheduling request is for the neural network communication. The request type may indicate that the scheduling request is used for SPS. The request descriptor describes the characteristics of the scheduling request.

The model identifier may describe the neural network type (e.g. the neural network type 400 and the neural network type 450, but the invention should not be limited thereto).

Figure 8:
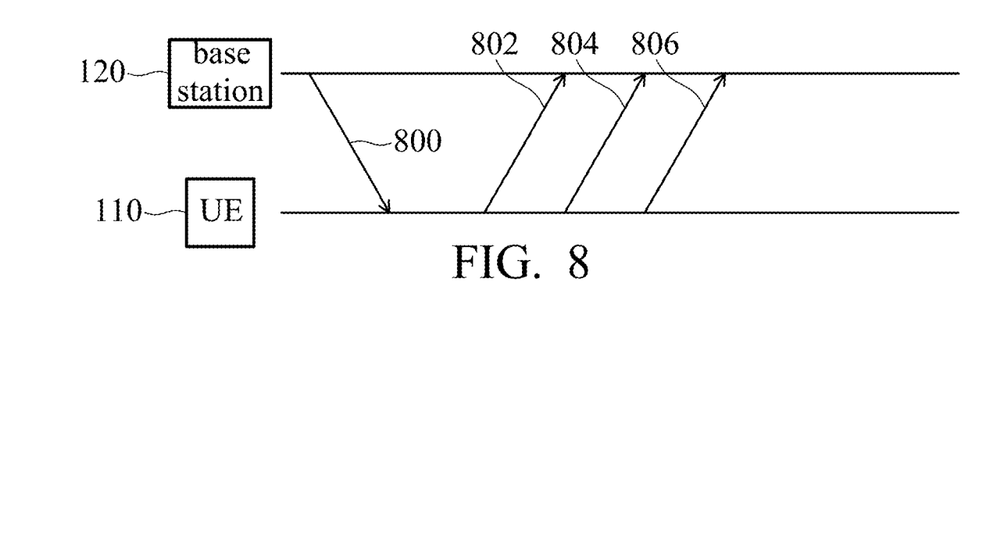
FIG. 8 is a flow chart of base station-initiated neural network communication in accordance with some embodiments of the invention.

FIG. 8 is a flow chart of base station-initiated neural network communication in accordance with some embodiments of the invention. The flow of FIG. 8 can be applied to the wireless communication system 100. As shown in FIG. 8, in step S800, the base station may transmit a signaling message (e.g. RRC Configuration) to the UE 110. In steps S802-S806, the UE 110 may transmit multiple data packets (or a data packet) including the neural network computation results to respond to a signaling message sent by the base station 120.

In the embodiment of the invention, each of the data packets in steps S802~S806 may include a packet header, a descriptor, and a data payload. The packet header in the data packets may include an indicator to indicate that the data packets include the neural network computation results. The descriptor in the data packets may include parameters and settings for the neural network computation results. The parameters and settings for the neural network computation results may include the type of the neural network, the number of layers in the neural network, the size of the neural network computation results, a sequence number, and a time stamp. The data payload may include the neural network computation results.

Figure 9:
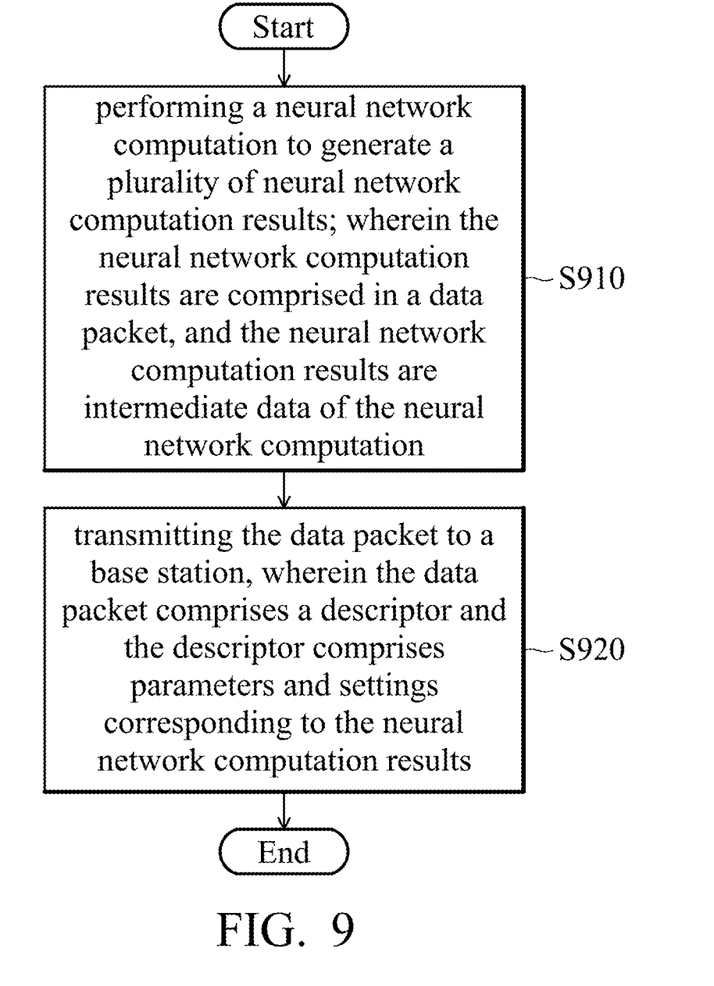
FIG. 9 is a flow chart of wireless communication method for neural network computation in accordance with some embodiments of the invention.

FIG. 9 is a flow chart of wireless communication method for neural network computation in accordance with some embodiments of the invention. The wireless communication method can be applied to the UE 110 of the wireless communication system 100. As shown in FIG. 9, in step S910, a processor of the UE 110 may perform a neural network computation to generate a plurality of neural network computation results; wherein the neural network computation results are comprised in a data packet, and the neural network computation results are intermediate data of the neural network computation. In step S920, a transmitter of the UE 110 may transmit the data packet to a base station, wherein the data packet comprises a descriptor and the descriptor comprises parameters and settings corresponding to the neural network computation results.

According to an embodiment of the invention, in the wireless communication method, the data packet further comprises a packet header and a data payload. The packet header may comprise an indicator to indicate that the data packet. The data payload may comprise the neural network computation results.

According to an embodiment of the invention, in the wireless communication method, the parameters and settings corresponding to the neural network computation results may comprise a neural network type, number of layers in the neural network, a size of the neural network computation results, level of the neural network computation results, a sequence number, and a time stamp.

According to an embodiment of the invention, in the wireless communication method, a Protocol Data Unit (PDU) type may be set in the data packet to indicate that the data packet is being used to carry the neural network computation results.

According to an embodiment of the invention, in the wireless communication method, a Quality of Service (QoS) type may be set in the data packet to indicate that the data packet is being used to carry the neural network computation results with corresponding QoS characteristics.

According to an embodiment of the invention, in the wireless communication method, the data packet may comprise a QoS Flow Identifier (QFI) or a 5G QoS Identifier (5QI).

According to an embodiment of the invention, the wireless communication method further comprise that the processor of the UE 110 may map neural network communication QoS Flow to a data radio bearer (DRB) that provides communication performance for the neural network computation results.

According to an embodiment of the invention, the wireless communication method further comprise that the transmitter of the UE 110 may send a scheduling request to the base station for the neural network computation. In an embodiment, the scheduling request may include a binary indication to indicate that the scheduling request is for the neural network computation, a request type, a request descriptor, a model identifier, and a size of the neural network computation results. In another embodiment, the scheduling request may further include a semi-persistent scheduling description, the number of repetitions of data transmission, and a periodicity of an uplink data packet transmission.

According to an embodiment of the invention, the wireless communication method further comprise that the transmitter of the UE 110 may send an uplink buffer status reports (BSR) message to the base station for the neural network computation, wherein the BSR message includes a message descriptor, wherein the message descriptor includes a neural network type and a size of the neural network computation results.

According to an embodiment of the invention, the wireless communication method further comprise that the transmitter of the UE 110 may send a network slice establishment request message to the base station for the neural network computation, wherein the network slice establishment request message includes a message descriptor, wherein the message descriptor includes a neural network type, a size of the neural network computation results, an average rate of a transmission of the neural network computation results, and a peak rate of the transmission of the neural network computation results.

According to an embodiment of the invention, the wireless communication method further comprise that the transmitter of the UE 110 may send a Radio Resource Control (RRC) connection setup message to the base station, wherein the RRC connection setup message includes a binary indication to indicate that the RRC connection setup message is for the neural network computation, a Protocol Data Unit (PDU) session type field, and a message descriptor. After the base station receives the RRC connection setup message, the base station may establish a PDU session for a neural network communication with the UE 110.

According to an embodiment of the invention, the wireless communication method further comprise that the receiver of the UE 110 may receive a RRC configuration from the base station, and then the transmitter of the UE 110 may transmit the data packet to the base station.

The wireless communication system 100 and the wireless communication method thereof disclosed in the present invention are able to facilitate efficient transmission for neural network transmission and improve delivery performance.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment for neural network computation, comprising:
    a processor, performing a neural network computation to generate a plurality of neural network computation results, wherein the neural network computation results are comprised in a data packet, and the neural network computation results are intermediate data of the neural network computation, wherein the intermediate data are the neural network computation results corresponding to computation nodes in partial layers of the neural network computation; and
    a transmitter, transmitting the data packet to a base station to perform computation corresponding to computation nodes in remaining layers of the neural network computation,
    wherein the data packet comprises a descriptor and the descriptor comprises parameters and settings corresponding to the neural network computation results,
    wherein the parameters and settings corresponding to the neural network computation results comprise: a neural network type, number of layers in the neural network, a size of the neural network computation results, level of the neural network computation results, a sequence number, and a time stamp.

2. The user equipment as claimed in claim 1, wherein the data packet further comprises:
    a packet header, comprising an indicator to indicate that the data packet; and
    a data payload, comprising the neural network computation results.

3. The user equipment as claimed in claim 1, wherein a Protocol Data Unit (PDU) type is set in the data packet to indicate that the data packet is being used to carry the neural network computation results.

4. The user equipment as claimed in claim 1, wherein a Quality of Service (QoS) type is set in the data packet to indicate that the data packet is being used to carry the neural network computation results with corresponding QoS characteristics.

5. The user equipment as claimed in claim 1, wherein the data packet comprises a QoS Flow Identifier (QFI) or a 5G QoS Identifier (5QI).

6. The user equipment as claimed in claim 1, wherein the transmitter sends a scheduling request to the base station for the neural network computation and wherein the scheduling request includes a binary indication to indicate that the scheduling request is for the neural network computation, a request type, a request descriptor, a model identifier, and the size of the neural network computation results.

7. The user equipment as claimed in claim 6, wherein the scheduling request further includes a semi-persistent scheduling description, the number of repetitions of data transmission, and a periodicity of an uplink data packet transmission.

8. The user equipment as claimed in claim 1, wherein the transmitter sends an uplink buffer status reports (BSR) message to the base station for the neural network computation, wherein the BSR message includes a message descriptor, wherein the message descriptor includes the neural network type and the size of the neural network computation results.

9. The user equipment as claimed in claim 1, wherein the transmitter sends a network slice establishment request message to the base station for the neural network computation, wherein the network slice establishment request message includes a message descriptor, wherein the message descriptor includes the neural network type, the size of the neural network computation results, an average rate of a transmission of the neural network computation results, and a peak rate of the transmission of the neural network computation results.

10. The user equipment as claimed in claim 1, wherein the transmitter sends a Radio Resource Control (RRC) connection setup message to the base station, wherein the RRC connection setup message includes a binary indication to indicate that the RRC connection setup message is for the neural network computation, a Protocol Data Unit (PDU) session type field, and a message descriptor.

11. A wireless communication method for neural network computation, applied to an user equipment (UE), comprising:
    performing, by a processor of the UE, a neural network computation to generate a plurality of neural network computation results; wherein the neural network computation results are comprised in a data packet, and the neural network computation results are intermediate data of the neural network computation, wherein the intermediate data are the neural network computation results corresponding to computation nodes in partial layers of the neural network computation; and transmitting, by a transmitter of the UE, the data packet to a base station to perform computation corresponding to computation nodes in remaining layers of the neural network computation, wherein the data packet comprises a descriptor and the descriptor comprises parameters and settings corresponding to the neural network computation results, wherein the parameters and settings corresponding to the neural network computation results comprise: a neural network type, number of layers in the neural network, a size of the neural network computation results, level of the neural network computation results, a sequence number, and a time stamp.

12. The wireless communication method as claimed in claim 11, wherein the data packet further comprises:

a packet header, comprising an indicator to indicate that the data packet; and a data payload, comprising the neural network computation results.

13. The wireless communication method as claimed in claim 11, wherein a Protocol Data Unit (PDU) type is set in the data packet to indicate that the data packet is being used to carry the neural network computation results.

14. The wireless communication method as claimed in claim 11, wherein a Quality of Service (QoS) type is set in the data packet to indicate that the data packet is being used to carry the neural network computation results with corresponding QoS characteristics.

15. The wireless communication method as claimed in claim 11, wherein the data packet comprises a QoS Flow Identifier (QFI) or a 5G QoS Identifier (5QI).

16. The wireless communication method as claimed in claim 11, further comprising:

sending a scheduling request to the base station for the neural network computation, wherein the scheduling request includes a binary indication to indicate that the scheduling request is for the neural network computation, a request type, a request descriptor, a model identifier, and the size of the neural network computation results.

17. The wireless communication method as claimed in claim 16, wherein the scheduling request further includes a semi-persistent scheduling description, the number of repetitions of data transmission, and a periodicity of an uplink data packet transmission.

18. The wireless communication method as claimed in claim 11, further comprising:

sending an uplink buffer status reports (BSR) message to the base station for the neural network computation, wherein the BSR message includes a message descriptor, wherein the message descriptor includes the neural network type and the size of the neural network computation results.

19. The wireless communication method as claimed in claim 11, further comprising:

sending a network slice establishment request message to the base station for the neural network computation, wherein the network slice establishment request message includes a message descriptor, wherein the message descriptor includes the neural network type, the size of the neural network computation results, an average rate of a transmission of the neural network computation results, and a peak rate of the transmission of the neural network computation results.

20. The wireless communication method as claimed in claim 11, further comprising:

sending a Radio Resource Control (RRC) connection setup message to the base station, wherein the RRC connection setup message includes a binary indication to indicate that the RRC connection setup message is for the neural network computation, a Protocol Data Unit (PDU) session type field, and a message descriptor.

* * * * *